United States Patent [19]

Nadherny

[11] Patent Number: 5,370,344
[45] Date of Patent: Dec. 6, 1994

[54] PIPE ANCHOR
[75] Inventor: Rudolph E. Nadherny, Naperville, Ill.
[73] Assignee: Ireco, Inc., Chicago, Ill.
[21] Appl. No.: 81,790
[22] Filed: Jun. 23, 1993
[51] Int. Cl.⁵ .............................................. F16L 5/00
[52] U.S. Cl. .................................. 248/56; 248/67.5; 248/548
[58] Field of Search ..................... 248/56, 57, 58, 62, 248/67.5, 74.1, 73, 548

[56] References Cited

U.S. PATENT DOCUMENTS

| | | | |
|---|---|---|---|
| 1,749,135 | 3/1930 | Harter | 248/56 |
| 1,821,295 | 9/1931 | Dieter | 248/56 |
| 2,454,064 | 11/1948 | Johnson | 248/56 |
| 2,546,792 | 3/1951 | Smith et al. | 248/56 |
| 2,625,354 | 1/1953 | Smith | 248/58 |
| 4,102,524 | 7/1978 | Cseri | 248/67.5 X |
| 4,222,538 | 9/1980 | Jensen et al. | 248/56 |

*Primary Examiner*—Ramon O. Ramirez
*Assistant Examiner*—Ko Hung Chan
*Attorney, Agent, or Firm*—Lockwood, Alex, FitzGibbon & Cummings

[57] ABSTRACT

Self-locking pipe anchors for anchoring pipes to structural members and particularly for anchoring air lines and other train pipes to structural members in the underframes of railway cars. Each pipe anchor includes a pair of interlocking members for clamping a length of pipe therebetween. One of the members is a base member which is generally saddle-shaped and adapted to be welded or otherwise secured to a structural or frame member to which a pipe is to be anchored. The base member has a pair of ears or flanges extending along opposite sides and juxtaposed to the end of at least one of the ears there is a protuberance having a camming surface opposing the adjacent end of the ear. The other member of the pair is a wedge which is adapted to be driven into self-locking assembly with the base member so as to clamp a longitudinal length of pipe therebetween. The wedge member has channel-like formations extending on opposite sides each of which embraces one of the ears when the members are assembled. At least one of the channel-like formations has an integral locking tab the distal end of which engages the camming surface when the wedge member is driven into assembled relationship with the base member. Upon such engagement, the locking tab is automatically bent so as to have locking engagement with the adjacent end of the adjacent ear thereby securing the members in assembled relationship with the length of pipe clamped therebetween.

15 Claims, 6 Drawing Sheets

PIPE ANCHOR

BACKGROUND AND DESCRIPTION OF THE INVENTION

This invention relates, generally, to improvements in pipe anchors of the type used for anchoring pipe or conduits to structural members, particularly structural members in the underframes of railway cars. Pipe anchors of the general type provided by the present invention are known and disclosed in U.S. Pat. No. 2,546,792 dated Mar. 27, 1951 and U.S. Pat. No. 4,222,538 dated Sep. 16, 1980. The pipe anchor systems disclosed in these patents include wedge members which are driven into place on pipe anchor base members to complete the pipe anchor installations. Thereafter, one or more locking tabs on a base member forming part of the pipe anchor assembly are bent so as to lock the assembly and installation into place. If for some reason the locking tabs are broken off during or after installation, it becomes necessary to remove and replace the base member in order to restore the installation. Such removal and replacement are always undesirable and may be difficult and time consuming, especially when the base member has been permanently welded into place on a structural member.

An important object of the present invention is the provision of a pipe anchor system wherein a locking tab or pair of tabs are provided on the wedge or driven clamp member and automatically become bent and locked into place when the wedge or driven clamp member is driven "home" so as to complete the assembly and installation of the pipe anchor system. Accordingly, with an improved pipe anchor system provided by the present invention, it is not necessary to bend a locking tab in a separate step after a wedge member has been driven into place. Further, in the event that a locking tab becomes broken for some reason, it is not necessary to remove or replace the base member of the pipe anchor system. On the contrary, it is only necessary to replace the relatively inexpensive wedge or driven clamp member.

Other objects and advantages of the invention will become apparent to those skilled in the art in view of the following detailed descriptions of several embodiments of the invention taken in conjunction with the accompanying drawings wherein.

Referring to FIGS. 1-5, a two-part pipe anchor system is indicated generally at 5 comprising a pipe clamping base member 6 and a pipe clamping wedge or driven clamp member 7. The base member 6 may be in the form of a forging, stamping or casting and is generally saddle shaped. A pair of longitudinally extending, upwardly inclined ears or flanges 8—8 extend laterally from opposite sides of the base member 6. A pair of protuberances or bosses 10—10 also extend laterally from opposite sides of the base member 6 so as to provide locking tab engaging and deforming surfaces 11—11.

Figures 1, 2, 3, 4:
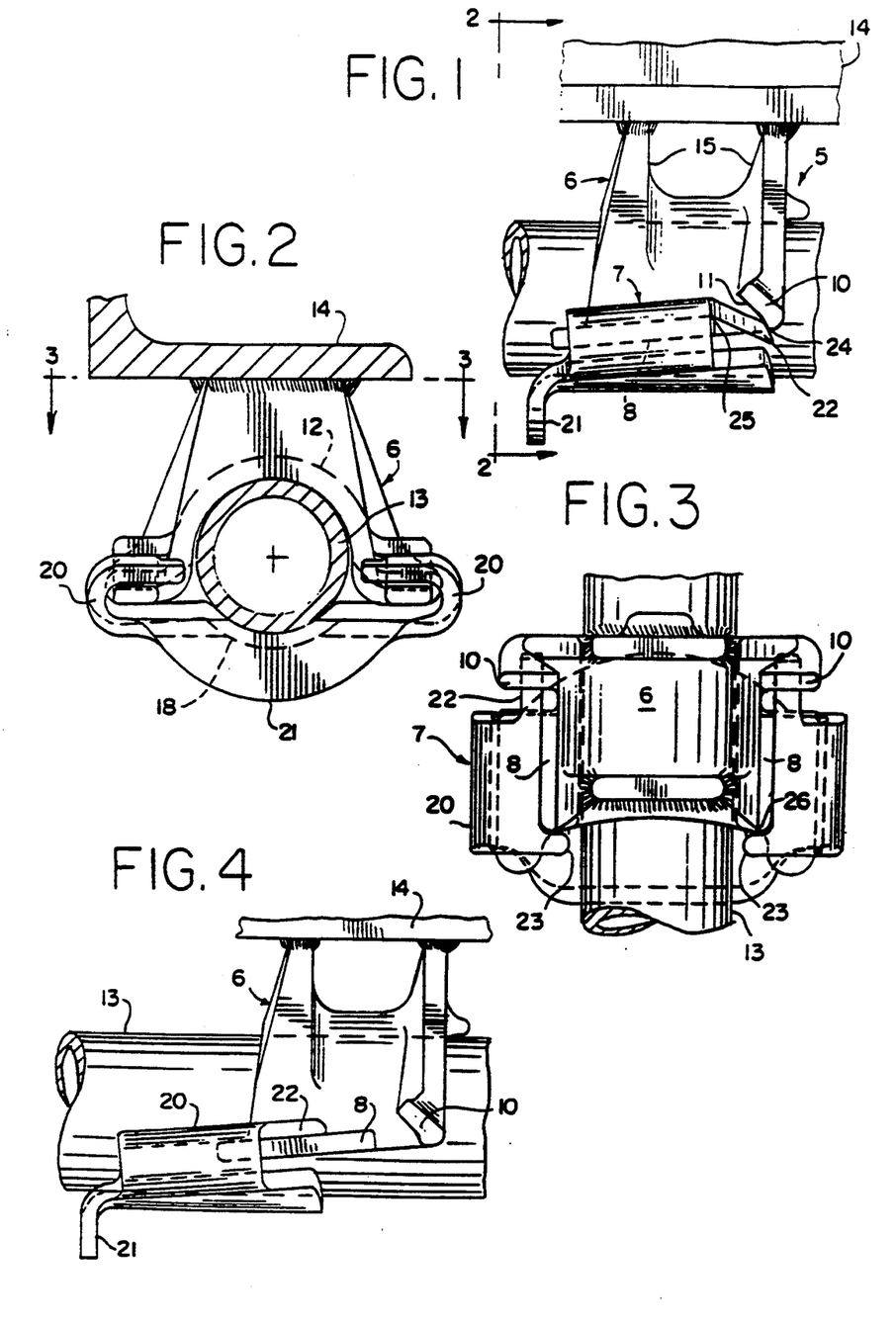
FIG. 1 is a fragmentary, side elevational view of a completed installation of one embodiment of the invention.
FIG. 2 is an end elevational view taken on line 2—2 of FIG. 1.
FIG. 3 is a top plan view taken on line 3—3 of FIG. 2.
FIG. 4 is a side elevational view corresponding to FIG. 1 but showing a preliminary relationship of the parts before the assembly and installation of the pipe anchor system is completed.

As shown in FIG. 2, the saddle portion 12 of the base member 6 is shaped to have interfitting clamping engagement with the upper portion of a pipe 13 which is to be anchored to a structural member 14. For example, the structural member 14 may be a cross bearer in the underframe of a railroad car and the pipe 13 may be an airline or other train pipe. The base member 6 has a pair of longitudinally upwardly extending flanges or bosses 15—15 by means of which it may be welded or otherwise secured to the structural member 14, as indicated.

The wedge or driven wedge member 7 may be stamped or otherwise formed so as to have a cradle portion 18 (FIG. 2), a pair of longitudinally extending ear embracing formations 20—20 on opposite sides in the form of inclined channels and a downwardly extending driving flange 21. The cradle portion 18 is contoured so as to have mating inter engagement with the underside of the pipe 13.

In order to install the pipe anchor 5 so as to secure or anchor the pipe 13 to the structural member 14, the base 6 is first welded to the frame 14. Then the pipe 13 is placed under the base 6 so as to fit under the saddle portion 12 as shown. The wedge member 7 is then partially assembled to the base 6 by fitting the rear ends of the channel formations 20 over the front ends of the ears 8 as shown in FIG. 4. The wedge member 7 will be pushed rearward by hand sufficiently to support the pipe 13 in place and maintain the assembly in hand-tight condition. Thereafter, a hammer may be used to strike the driving flange 21 and drive the wedge 7 "home" into full clamping engagement wherein the pipe 13 is firmly secured or anchored in place.

Each of the ear embracing channel formations 20 on the wedge 7 is provided on the rear end of the upper side with a locking tab 22. As the wedge 7 is driven to its fully assembled clamping relationship with the base 6, as shown in FIG. 1, it will be seen that the distal end of each tab 22 will have come into engagement with the concave surface 11 on the adjacent protuberance 10. This engagement causes the tabs to be progressively bent or cammed downwardly into a full locking position as shown in FIG. 1.

At the front end of each of the ear embracing formations 20, inwardly extending, tab-like, wedge stops 23 are provided which engage the front edges of the base 6 as shown in FIG. 3 when the wedge 7 is completely driven. The wedge stops 23 are so positioned that when they come into stopping engagement with the base 6, the tabs 22 will hook over the upper rear edges of the ears 8 as indicated at 25 (FIG. 1). Thus, there will be three points of engagement between the wedges 7 and the base 6 on each side of the pipe anchor 5, namely, the inter engagement at 25, the inter engagement of the wedge stops 23 with the base 6 as indicated at 26 in FIG. 3, and the engagement between the tabs 22 and the protuberances 10 as indicated at 24 (FIG. 1). These three points of inter engagement serve to firmly secure and anchor the pipe 13 to the structural member 14 and resist the driven wedge member 7 from becoming loose with respect to the base 6 to which it has been assembled.

If, for some reason, it becomes necessary to free the pipe 13 from the structural member 14, the wedge member 7 can be driven forwardly (i.e., toward the left in FIG. 1) and each bent down tab 22 will bend upward sufficiently to allow it to ride over the ear 8. If a locking tab 22 breaks off for any reason, its wedge member 7 may be discarded and replaced with a new one. Heretofore, when the locking tabs in prior pipe anchors were located on the base members and broke off or became defective, it was necessary to not only replace the base member but also to cut it off where welded to a structural member and then reweld the new base member. Thus, the repair work involved both the time and skill of a welder in addition to the cost of the base member, it being substantially more than the cost of a wedge. Hence, the pipe anchor 5 is not only equal in anchoring performance to the pipe anchors of the prior art, but it is self-locking and can be repaired or replaced with much greater ease and at substantially reduced expense.

Figures 5, 6, 7, 8:
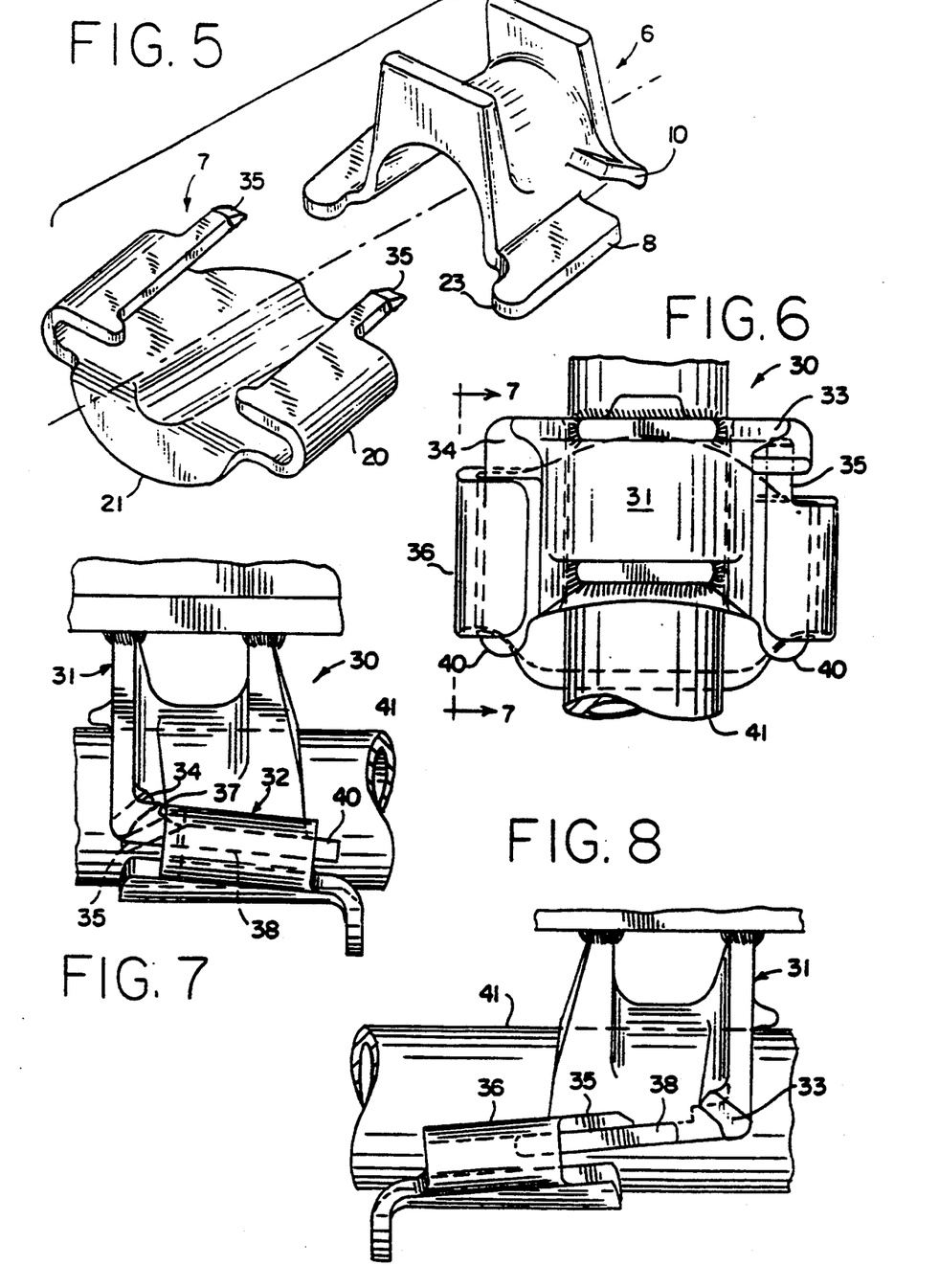
FIG. 5 is an exploded top perspective view showing the wedge and base members which comprise the pipe anchor system shown in FIG. 1-4.
FIG. 6 is a top plan view corresponding to FIG. 3 of a modification of the invention.
FIG. 7 is a side elevational view taken on line 7—7 of FIG. 6.
FIG. 8 is a side elevational view corresponding to FIG. 4 of the partially assembled pipe anchor system of FIGS. 6 and 7.

A modification of the invention is shown in FIGS. 6-8 wherein a pipe anchor is indicated generally at 30 comprising a base member 31 and a wedge member 32. These members correspond, respectively, generally, to the base member 6 and wedge member 7 of the pipe anchor 5 of FIGS. 1-5. However, the base member 31 has a locking tab deflecting protuberance 33 located on only one side and on the opposite side is provided with a wedge member stop formation or boss 34. The wedge 32 has only one locking tab 35 which is on the right-hand side as viewed in FIG. 6 so as to have inter engaging and deforming engagement with the protuberance 33. When the wedge member 32 is driven home during installation, the leading edge on the left-hand ear embracing formation 36 engages the wedge stop 34 as indicated at 37 in FIG. 7. When the stop engagement at 37 is reached, the locking tab 35 will have been bent downwardly and hooked over the upper leading edge of the adjacent ear 38 as shown in broken line in FIG. 7.

When a wedge member 32 is driven "home" and the pipe anchor 30 is thereby fully installed, it will be noted that the front end of each of the ears 38 on the base member 31 will be exposed as indicated at 40—40 in FIGS. 6 and 7. Such exposure serves as an indication to the installer that the wedge has been fully driven into its clamping relationship with the base 31 on the pipe 41.

Figure 9:
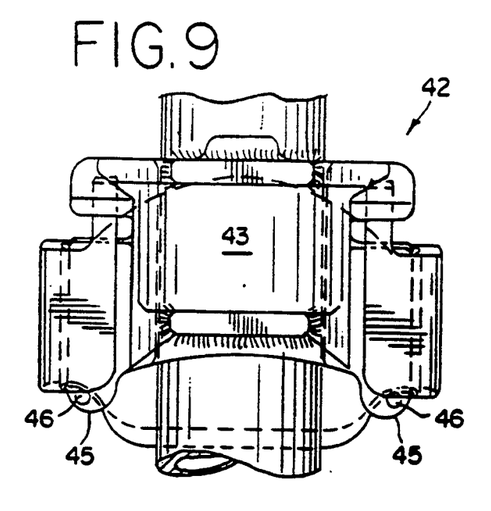
FIG. 9 is a top plan view corresponding to FIGS. 3 and 6 of a third embodiment of the invention.
Figure 10:
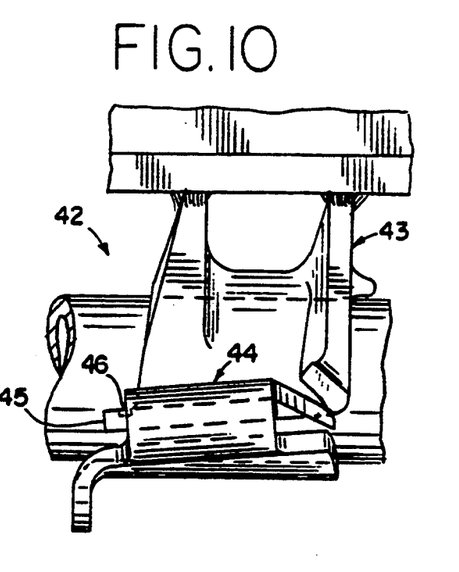
FIG. 10 is a side elevational view of the third embodiment of the invention and corresponding generally to FIG. 1.

A further embodiment of the invention is shown in FIGS. 9 and 10 wherein a pipe anchor system is indicated generally at 42 comprising a base member 43 and a wedge member 44. The longitudinally extending ears 45 on opposite sides of the base member 42 are provided adjacent there front ends with dimples or indentations 46. When a wedge 44 is in its fully driven position as shown in FIGS. 9 and 10, the dimples or indentations 46 will be exposed thereby serving as indicators of the fully driven condition.

Figure 11:
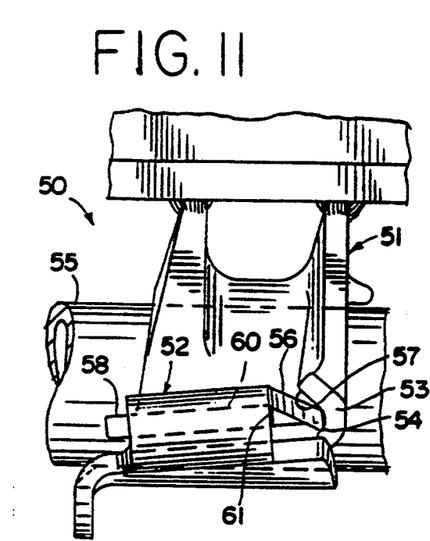
FIG. 11 is a side elevational view of the completed installation of a fourth embodiment of the invention and corresponding generally to FIGS. 1 and 10.

Referring to FIG. 11, a pipe anchor is indicated generally at 50 comprising a base member 51 and a wedge member 52. The locking tab engaging and deflecting protuberances 53 on opposite sides of the base member 51 have tab engaging surfaces 57 which terminate in pockets 54. As the pipe anchor wedge 52 is driven into a final clamping relationship with the base member 51 and pipe 55, the end of the locking tabs 56 progressively bend down following the cam surface 57 until the distal ends of the tabs reach and enter the pockets 54. The exposed front ends 58 of the ears 60 on opposite sides of the base member 51 serve to indicate to the installer that the wedge 52 has been completely driven so that the locking tabs 56 are hooked over the front edges of the ears 60 on the base 51 as indicated at 61.

Figure 12:
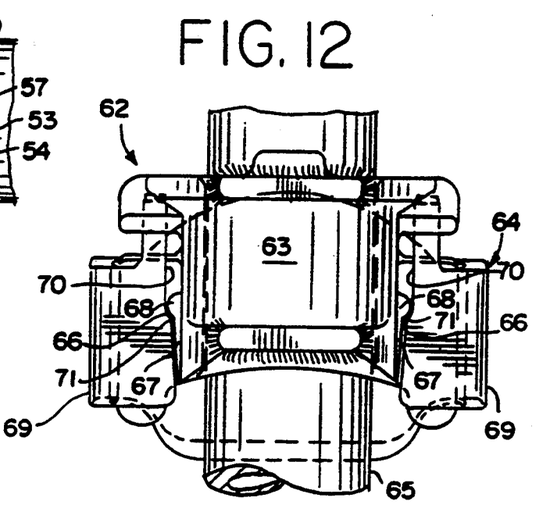
FIG. 12 is a top plan view corresponding to FIGS. 3, 6 and 9 of a fifth embodiment of the invention.

A further modification of the invention is shown in FIG. 12 in a pipe anchor indicated generally at 62 comprising a base member 63 and a wedge 64 shown in fully assembled clamping relationship on a pipe 65. Wedge stop formations 66 are provided on opposite sides of the saddle base member 63. Each of the wedge stops 66 comprises a inclined or ramp section 67 leading to a rounded protuberance or boss 68. The wedge stops 66 are so positioned as to have inter-engagement with the inner upper edges on the ear embracing formations 69 on opposite sides of the wedge 64. These inner upper edges are in turn relieved or cut away so as to have a cut-away edge portion 70 terminating rearwardly in a shoulder 71 which has stopping engagement with the adjacent wedge stop or protuberance 68 as shown in FIG. 12.

The installer can observe when the shoulders 71 engage the wedge stop protuberances 68 and thereby ascertain that the wedge 64 has been fully driven into assembled engagement with the base member 63 and pipe 65.

Figure 14:
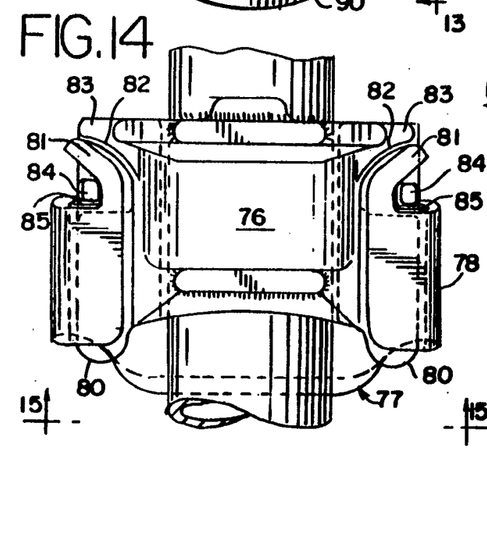
FIG. 14 is a top plan view taken on line 14—14 of FIG. 13.
Figure 15:
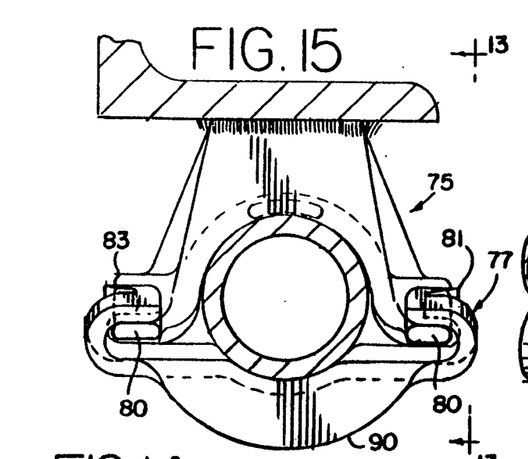
FIG. 15 is an end elevational view taken on line 15—15 of FIG. 14.

In the five foregoing embodiments of the invention, the locking tabs or wedge tabs on the pipe anchor wedge members are all automatically bent downwardly into locking position when the wedge members are driven into assembled relationship with their respective base members and the pipes clamp therebetween. In the embodiment of the invention shown in FIGS. 13-17, the wedge tabs or locking tabs are bent or deflected outwardly into locking condition with the base member when the wedges are driven to their "home" positions. A pipe anchor system is indicated generally at 75 in FIGS. 13-17 comprising a base member 76 and a wedge member 77. The wedge 77 has channel shaped formations 78 extending along opposite sides which slidably fit over the lateral flanges or ears 80 that extend along each side of the base 76. Each of the formations 78 has a tapered outwardly bendable locking wedge tab 81 the distal end of which is rounded and engages the concave camming surface 82 on a tab deflecting formation 83 carried on each side of the base 76. The wedge tabs 81 are shown in their outwardly bent and locking condition in FIGS. 13-15 with the tabs being bent outwardly and locked around upstanding wedge stops 84 formed on the base member 76. In the fully driven and locked condition shown in FIG. 14, the wedge 77 cannot move or shift rearwardly with respect to the base 76 since the wedge tabs 81 engage the formations 83 and the shoulders on the wedge formations 78 engage the wedge stops 84 as indicated at 85 (FIG. 14). The wedge 77 cannot move or shift forwardly since the wedge tabs 81 are hooked around the stops 84.

Figures 13, 16, 17:
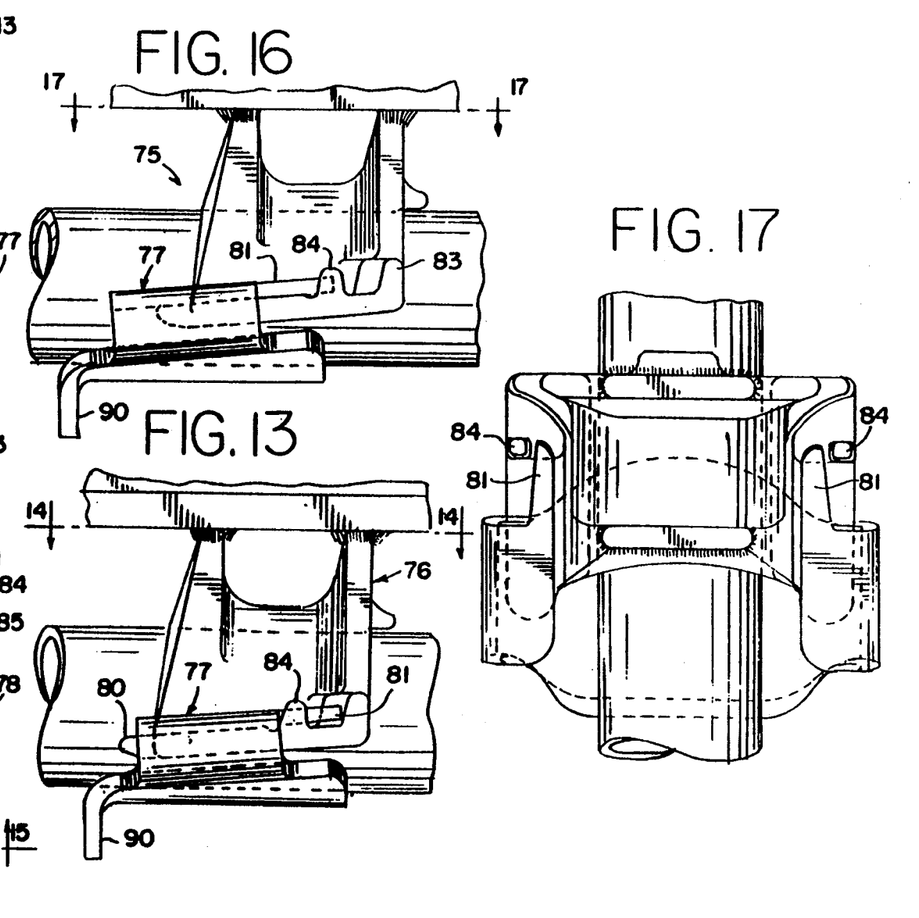
FIG. 13 is a side elevational view of the completed installation of a sixth embodiment of the invention.
FIG. 16 is a side elevational view showing the embodiment of FIGS. 13-15 partially installed.
FIG. 17 is a top plan view of FIG. 16.

In FIG. 16, the wedge 77 is shown as partially assembled onto the base 76 with the wedge tabs 81 in their straight condition.

If for any reason there is a need to disassemble the pipe anchor system of FIGS. 13-17, it is only necessary to drive the wedge 77 off from the base member 76 with hammer blows on the rear side of the flange 90 and thereby bend the wedge tabs 81 inwardly enough to allow the wedge 77 to be readily backed off and removed from the base 76.

Figures 18, 19, 20:
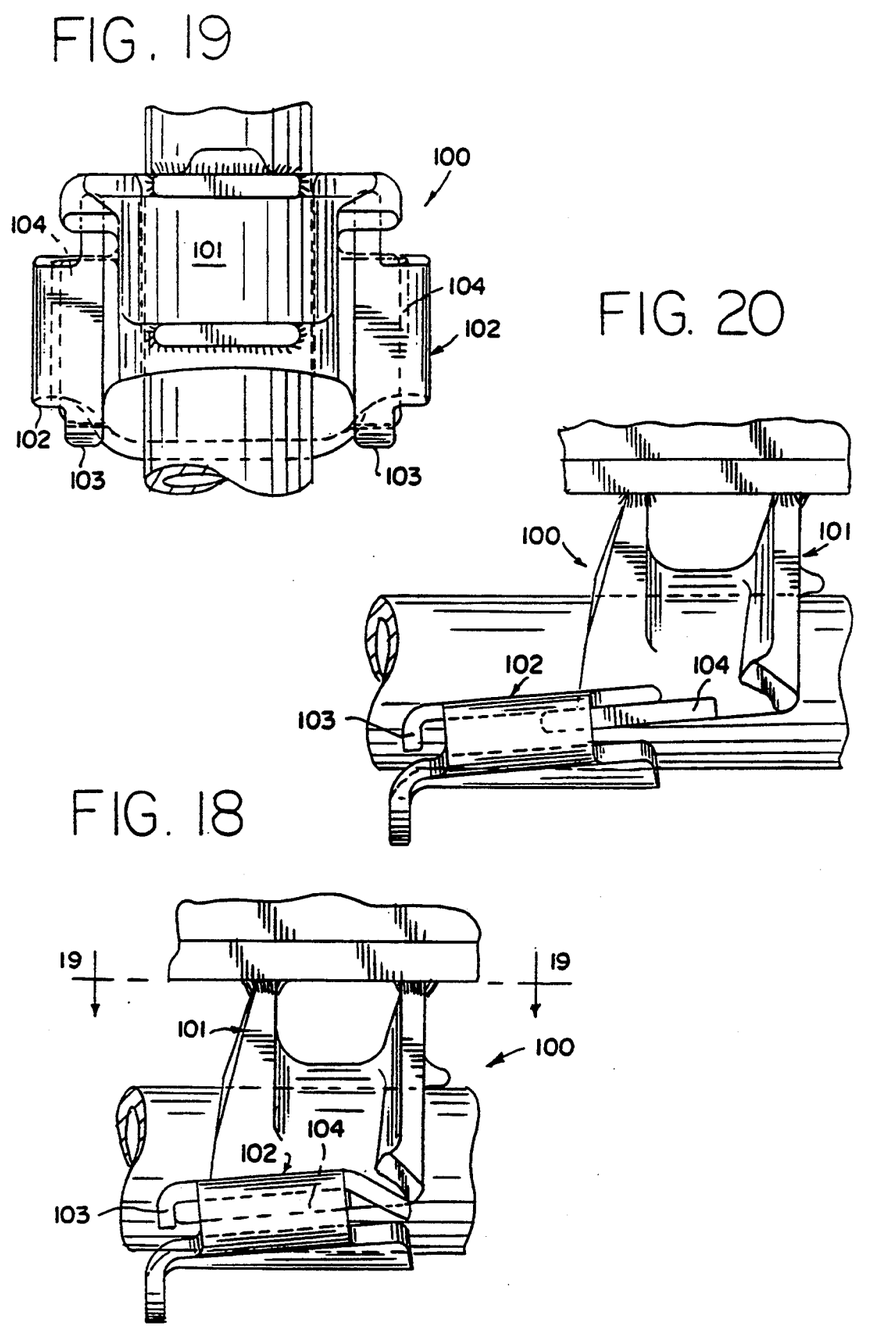
FIG. 18 is a side elevational view of the completed installation of a seventh embodiment of the invention.
FIG. 19 is a top plan view taken on line 19—19 of FIG. 18.
FIG. 20 is a side elevational view showing the embodiment of FIGS. 18 and 19 partially installed.

Referring to the seventh embodiment of the invention shown in FIGS. 18-20, this embodiment is indicated generally therein at 100 comprising a base member indicated generally at 101 and a wedge member indicated generally at 102. This seventh embodiment corresponds to the first embodiment described above in connection with FIGS. 1-5 with the following differences. In the first embodiment tab-like, wedge-stops 23 (FIG. 3) were relied on to limit the extent to which the wedge member 7 could be driven and indicate when it was completely driven. In the embodiment shown in FIGS. 18-20 the WEDGE STOPS 23 are replaced with wedge stops 103 in the form of downwardly turned extensions or hooks on the forward ends of the upper portions of the wedge members 102.

When the pipe anchor assembly 100 is assembled in hand tight condition as shown in FIG. 20, the wedge stops 103 will be positioned forwardly of the upwardly inclined ears or flanges 104 extending laterally from opposite sides of the base member 100. When the pipe anchor assembly 100 is fully assembled as shown in FIG. 18, the wedge stops 103 will have stopping engagement with the forward ends of the flanges 104 thereby providing a readily observable and positive indication that the wedge member 102 has been fully driven into place.

Figures 21, 22, 23:
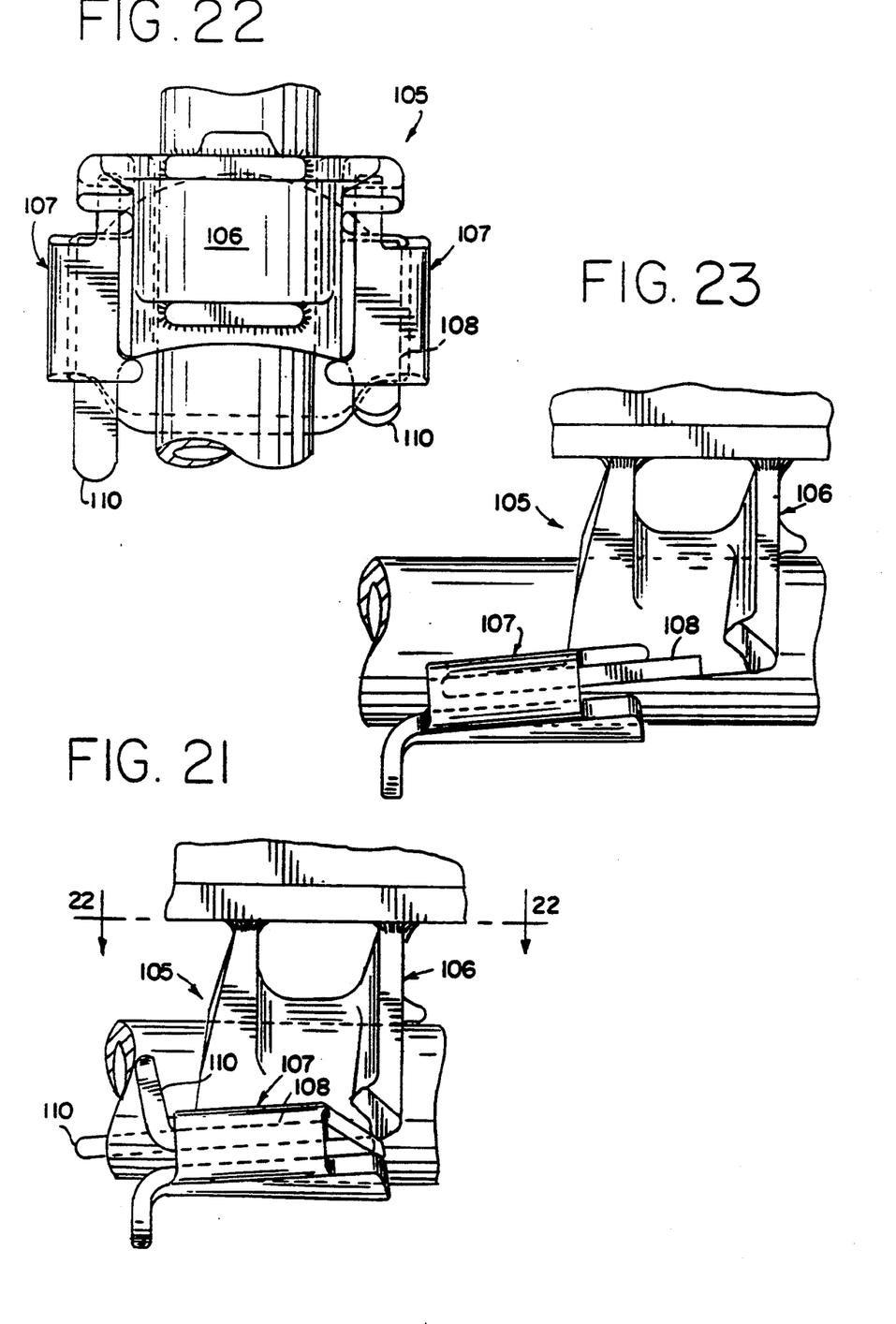
FIG. 21 is a side elevational view of the completed installation of an eighth embodiment of the invention.
FIG. 22 is a top plan view taken on line 22—22 of FIG. 21.
FIG. 23 is a side elevational view showing the embodiment of FIGS. 21 and 22 partially installed.

In FIGS. 21-23 an eighth embodiment of the invention is shown and indicated generally at 105 comprising a base member indicated generally at 106 and a wedge member indicated generally at 107. This embodiment of the invention corresponds to the first embodiment as shown and described in connection with FIGS. 1-5 with one modification. This modification consists of extending forwardly the length of the upwardly inclined, longitudinally extending flanges 108 on opposite sides of the base member 106 so as to provide locking tabs 110. In FIGS. 21 and 22, one of these locking tabs is shown in its upwardly bent locking condition while the other remains unbent. When the pipe anchor locking system 105 is completely installed as shown in FIG. 21 and the locking tabs 110 are bent upwardly so as to engage the front edge of the adjacent wedges 108, it will be seen that the wedges are prevented and locked from moving toward the front while they are prevented from moving to the rear by the downwardly bent wedge tabs 111 (FIG. 21).

It will be understood that, in addition to the foregoing embodiments, additional embodiments of the invention may be made without departing from the scope of the claims.

What is claimed is:

1. A self-locking anchor system for pipes comprising first and second pipe clamping members for clamping a longitudinal length of a pipe therebetween with said first clamping member being a generally saddle-shaped base member for embracing a substantial longitudinal portion of a length of pipe and said second clamping member being a wedge member drivable into interlocking pipe-clamping engagement with said first member and with said pipe, said first clamping base member having a pair of longitudinally extending flanges or ears projecting from opposite sides thereof and at least one locking tab engaging protuberance projecting from one side thereof in spaced proximity to the adjacent end of one of said ears, said second clamping wedge member having a pair of opposed ear embracing formations for embracing said ears in wedging relationship with at least one of said formations having a longitudinally extending deformable locking tab in position to engage said locking tab-engaging protuberance when said wedge member is driven into said pipe-clamping relationship with said base member and thereby be automatically deformed into interlocking relationship with said base member.

2. The self-locking anchor system of claim 1 wherein at least one of said ear embracing formations on said wedge member has a stop formation which comes into stopping engagement with said base member when each said deformable locking tab has been deformed into its said interlocking relationship.

3. The self-locking anchor system for pipes called for in claim 1 wherein said locking tab-engaging protuberance has a concave camming surface which is engaged by the distal end of the adjacent deformable locking tab.

4. A self-locking pipe anchor system for pipes comprising first and second pipe clamping members for clamping a longitudinal length of a pipe therebetween with said first clamping member being a generally saddle-shaped base member for embracing a substantial longitudinal portion of a length of pipe and said second clamping member being a generally cradle shaped wedge member drivable into interlocking pipe-clamping engagement with said base member and with said pipe, said base member having a pair of longitudinally extending flanges or ears projecting from opposite sides thereof and at least one locking tab-engaging protuberance projecting from one side thereof in spaced proximity to the adjacent end of one of said ears, said wedge member having a pair of opposed ear-embracing formations for embracing said ears in wedging relationship with at least one of said formations having a longitudinally extending deformable locking tab in position for its distal end to deformably engage a surface of a said locking tab-engaging protuberance when said wedge member is driven into its said pipe-clamping relationship with said base member and thereby be automatically deformed into interlocking relationship with the adjacent end of the adjacent ear so as to prevent separation of said base and wedge members.

5. The self-locking pipe anchor system of claim 4 wherein said longitudinally extending flanges or ears and said ear embracing formations are correspondingly inclined.

6. The self-locking pipe anchor system of claim 5 wherein there is a pair of said locking tab-engaging protuberances and each said ear-embracing formation has a said longitudinally extending deformable locking tab engageable with one of said protuberances.

7. The self-locking pipe anchor system of claim 5 wherein at least one of said ear embracing formations has a stop on the end opposite the end having said deformable locking tab thereon which stop comes into engagement with said first clamping base member when each said deformable locking tab has been deformed into its said interlocking relationship.

8. The self-locking pipe anchor system of claim 4 wherein at least one of said ears is of such length relative to its ear embracing formation that a predetermined portion of the end of said one ear opposite its end having a locking tab-engaging protuberance thereon is exposed when said locking tab has been fully deformed into its said interlocking relationship.

9. The self-locking pipe anchor system of claim 4 wherein only one of said ear embracing formations has a said deformable locking tab and said base member has a wedge stopping protuberance on the side opposite said locking tab-engaging protuberance, and said other of said ear embracing formations engages said wedge stopping protuberance when said one locking tab has been fully deformed into its said interlocking relationship.

10. The self-locking pipe anchor system of claim 4 wherein at least one of said ears is of such length relative to its ear embracing formation that a portion of the end of said one ear opposite its end having a locking tab thereon is exposed when said locking tab has been fully deformed into its said interlocking relationship, and said exposed end portion has an indicator thereon which becomes exposed when said locking tab has been fully deformed into its said interlocking relationship.

11. The self-locking pipe anchor system of claim 4 wherein said surface of said locking tab-engaging protuberance is shaped to limit the extent to which said locking tab is deformed thereby.

12. The self-locking pipe anchor system of claim 4 wherein at least one of said opposed ear embracing formations on said wedge member has a wedge stop shoulder facing the adjacent side of said base member and said base member has a wedge stop protuberance on said adjacent side, said wedge stop shoulder having wedge stopping engagement with said wedge stop protuberance when each said locking tab has been fully deformed into its said interlocking engagement.

13. The self-locking pipe anchor system of claim 4 wherein at least one of said ear-embracing formations on said wedge member has a stop formation on the end opposite the end having a said longitudinally extending deformable locking tab, said stop formation being in the form of a hook which engages the adjacent end of the adjacent ear when said locking tab has been deformed into said interlocking relationship.

14. The self-locking pipe anchor system of claim 4 wherein at least one of said ears said base member has a locking tab which is deformable after said wedge member is driven into its said pipe-clamping relationship with said base member so as to have locking engagement with the end of the adjacent ear-embracing formation opposite said end thereof having a said deformable locking tab.

15. A self-locking pipe anchor system comprising first and second pipe clamping members for clamping a longitudinal length of pipe therebetween with said first clamping member being a generally saddle-shaped base member for embracing a substantial longitudinal portion of a length of pipe and said second clamping member being a generally cradle shaped wedge member drivable into interlocking pipe-clamping engagement with said base member and with said pipe, said base member having a pair of longitudinally extending flanges or ears projecting from opposite sides thereof and at least one locking tab engaging protuberance projecting from one side thereof, said wedge member having a pair of opposed ear embracing formations for embracing said ears in wedging relationship therewith and with at least one of said ear embracing formations having a longitudinally extending deformable locking tab in position for its distal end to endwise engage a surface on said locking tab engaging protuberance and thereby become automatically deformed outwardly when said wedge is driven into its said pipe clamping relationship with said base member, and said base member having an upstanding wedge stop juxtaposed to said locking tab engaging protuberance, each said locking tab being automatically bent outwardly and around a said upstanding wedge stop when said wedge member is driven into its said pipe clamping relationship with said base member.

* * * * *